Patented Mar. 18, 1947

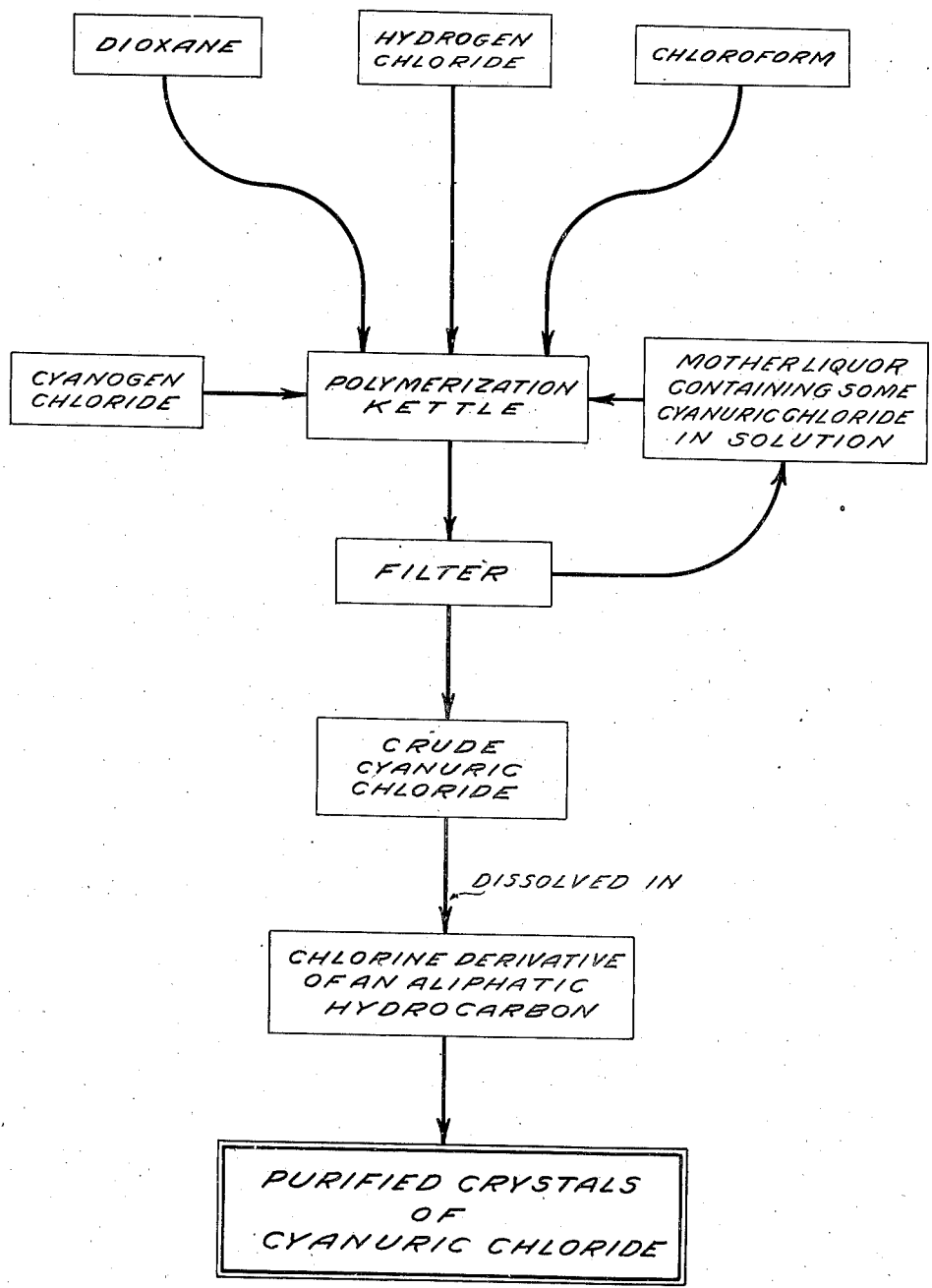

2,417,659

UNITED STATES PATENT OFFICE 2,417,659

METHOD OF PREPARING CYANURIC CHLORIDE

Wilbur N. Oldham, Old Greenwich, Conn., assignor to American Cyanamid Company, New York, N. Y., a corporation of Maine Application May 6, 1944, Serial No. 534,461

5 Claims. (Cl. 260—248)

The present invention relates to a method of preparing cyanuric chloride.

It has been proposed heretofore to prepare cyanuric chloride by polymerizing cyanogen chloride dissolved in a mixture of chloroform and alcohol using hydrogen chloride as a catalyst. One difficulty with the above method is that the final product is reasonably soluble in the mixture of chloroform and alcohol and hence separation of the cyanuric chloride therefrom is difficult.

Another difficulty resides in the fact that the catalyst, hydrogen chloride in this case, is only slightly soluble in the mixture of chloroform and alcohol and hence only limited amounts of the catalyst were available in the reaction.

The principal object of the present invention is to provide a medium in which the solubility of the cyanuric chloride will be depressed while that of the hydrogen chloride will be increased. Other objects will appear hereinafter.

These objects may be readily accomplished as it has now been discovered that cyanuric chloride may be prepared in good yield and of high purity by polymerizing cyanogen chloride in the presence of hydrogen chloride in a solvent medium consisting of dioxane and chloroform.

Dioxane has been found to be a remarkable solvent in this process, particularly because of its ability to absorb a large amount of hydrogen chloride, the latter being the polymerizing agent. At the same time the dioxane reduces the solubility of the cyanuric chloride in the chloroform.

While there is an optimum ratio of dioxane to chloroform for most efficient results, yet the use of any proportion of the former produces an effect which is better than chloroform alone, or than with chloroform and alcohol. If too much dioxane is used, the cyanuric chloride is produced in small "mushy" crystals which are difficult to filter. If too little dioxane is used, the amount of hydrogen chloride which can be held is lessened, and the solubility of the cyanuric chloride in the solvent mixture increases thereby making the recovery of the product cumbersome. An optimum solvent range is from equal parts of dioxane and chloroform to about 3 parts of dioxane and 2 parts of chloroform by weight.

In the drawing, the single figure is a flow sheet of a preferred process.

In carrying out the process, a charge of dioxane is placed in a reaction vessel provided with suitable means of cooling and agitation. The hydrogen chloride is added to the dioxane, the latter being cooled to a temperature sufficiently low to avoid loss of the low-boiling cyanogen chloride when added, and preferably to a temperature within the range of 0–10° C., and the chloroform then added. Cyanogen chloride may then be fed to the solvent containing the hydrogen chloride for polymerization to cyanuric chloride.

After standing for several hours, the reaction mixture is filtered to remove the precipitated cyanuric chloride. The mother liquor still containing a small amount of cyanuric chloride may be returned to the polymerization kettle so that the values therein will not be lost. The crude product obtained on the filter may be purified by recrystallization from a chlorine derivative of an aliphatic hydrocarbon, such as, for example, carbon tetrachloride, chloroform, ethylene dichloride, trichloroethylene, or the like.

As an alternative procedure, the crude cyanuric chloride may be purified by distillation at atmospheric pressure as it melts at 145° C. and boils at 194° C./760 mm. These temperatures are high enough to admit of a clean separation of the purified product from the solvent mixture. The volatilized hydrogen chloride is absorbed in dioxane and may be reused for polymerizing more cyanogen chloride.

Example 95 grams of cyanogen chloride were gradually added to an agitated mixture of 40 grams of dioxane, 20 grams of hydrogen chloride and 40 grams of chloroform cooled to 0° C. The reaction mixture, after standing at 0° C. for 48 hours was filtered and the cyanuric chloride crystals dried at room temperature. 80 grams (84.2% yield) of the product were obtained, melting at 146° C.

The product after recrystallization from trichloroethylene forms large colorless crystals melting at 145° C. It is readily soluble in ether, benzene, heptane and chloroform.

Cyanuric chloride is of particular value as an intermediate in the preparation of triazine compounds which may find application in the field of dyestuffs, explosives, synthetic resins, rubber and medicine.

While the invention has been described with particular reference to specific embodiments, it is to be understood that it is not to be limited thereto, but is to be construed broadly and restricted solely by the scope of the appended claims.

I claim:

1. A method of preparing cyanuric chloride which includes the step of polymerizing cyanogen chloride in the presence of hydrogen chloride in a solvent medium consisting of dioxane and chloroform.

2. Method of claim 1 in which the solvent medium is maintained at a temperature within the range of 0°–10° C.

3. Method of claim 1 in which the components of the solvent medium are present within a range of from equal parts of dioxane and chloroform to about 3 parts dioxane and 2 parts of chloroform by weight.

4. In a method of preparing cyanuric chloride, the steps which comprise polymerizing cyanogen chloride in the presence of hydrogen chloride in a solvent medium of dioxane and chloroform at a temperature between about 0° and 10° C. to form cyanuric chloride, and separating the latter.

5. In a method of preparing cyanuric chloride, the steps which comprise polymerizing cyanogen chloride in the presence of hydrogen chloride in a solvent medium of dioxane and chloroform at a temperature between about 0° and 10° C. to form cyanuric chloride, separating the latter and recrystallizing the same from a chlorine derivative of an aliphatic hydrocarbon.

WILBUR N. OLDHAM.

REFERENCES CITED

The following references are of record in the file of this patent:

FOREIGN PATENTS

| Number | Country | Date |
|--------|---------|------|
| 399,464 | Canadian | Sept. 23, 1941 |

OTHER REFERENCES

Official Gazette, vol. 544, pages 458–459, Nov. 17, 1942.